United States Patent [19]
Hafla

[11] 3,943,803
[45] Mar. 16, 1976

[54] MOUNTING ARRANGEMENT FOR A SPINDLE

[75] Inventor: Dietmar Hafla, Hohengehren, Germany

[73] Assignee: Index-Werke KG Hahn & Tesky, Esslingen, Germany

[22] Filed: Mar. 5, 1975

[21] Appl. No.: 555,624

[30] Foreign Application Priority Data
Mar. 6, 1974 Germany............................ 2410540

[52] U.S. Cl. .................... 82/30; 82/31; 308/189 A
[51] Int. Cl.² ........................................ B23B 19/02
[58] Field of Search................... 82/30, 31, 28 R; 308/189 A, DIG. 4

[56] References Cited
UNITED STATES PATENTS

| | | | |
|---|---|---|---|
| 3,211,060 | 10/1965 | McCann | 308/207 A |
| 3,533,316 | 10/1970 | Porath | 82/31 |
| 3,664,718 | 5/1972 | Uhtenwoldt | 308/189 A |
| 3,686,986 | 8/1972 | Ledergerber et al. | 82/30 |

Primary Examiner—Leonidas Vlachos
Attorney, Agent, or Firm—Michael S. Striker

[57] ABSTRACT

At least two longitudinally spaced and axially adjustable anti-friction bearings are provided on a support and each of these has an inner and an outer race. A spindle is rotatably journalled in these bearings and has one end adjacent one of the bearings. The spindle is subject to the action of axial forces acting upon one end in direction toward another end of the spindle which is adjacent the other bearing. A pressure-exerting arrangement adjacent the other end serves to exert upon the other bearing a counter force acting in direction towards the one end of the spindle and tending to shift the spindle counter to the axial forces, and a transmitting arrangement transmits the counter force to the outer race of the one bearing to adjust the same axially relative to the spindle in accordance with the shifting of the latter.

15 Claims, 5 Drawing Figures

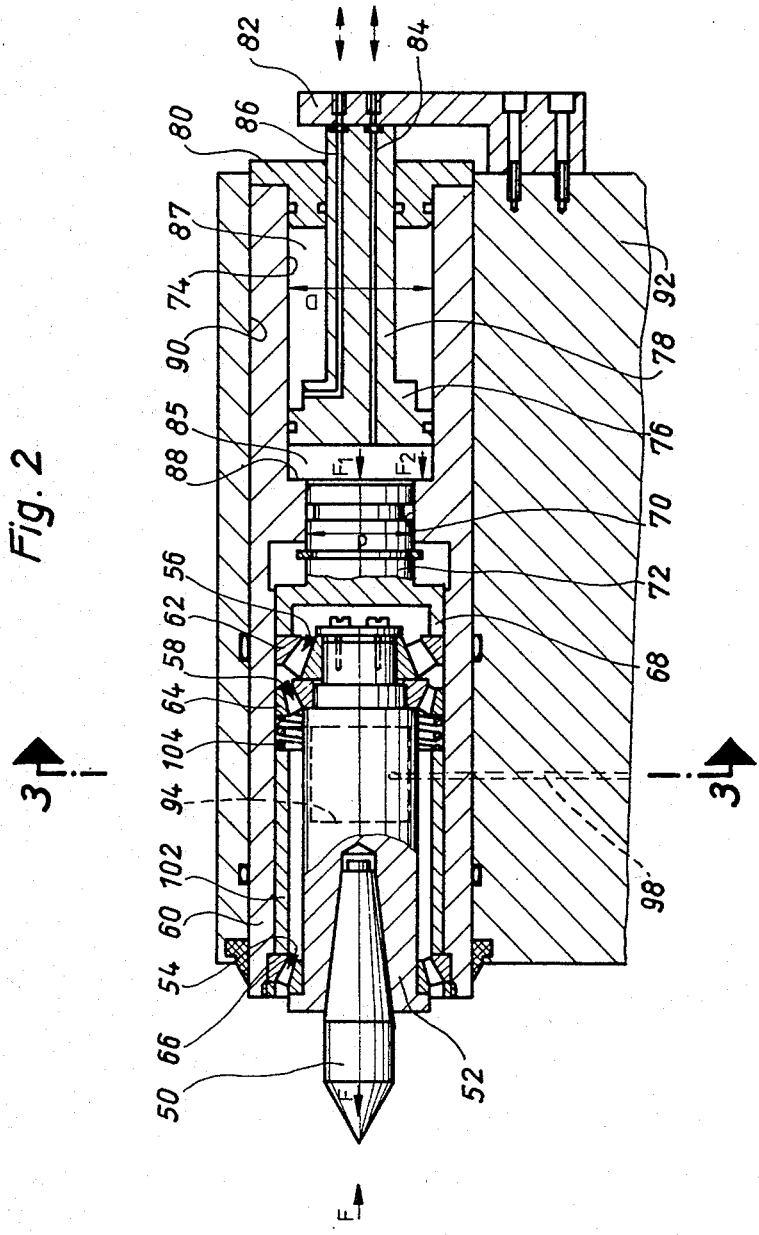

MOUNTING ARRANGEMENT FOR A SPINDLE

BACKGROUND OF THE INVENTION

The present invention relates to a mounting arrangement for a spindle, and more particularly to a mounting arrangement for a spindle which is subject to axially directed forces.

Many spindles, particularly tail spindles, are subject to axially directed forces. In such cases, special problems occur with respect to the axial forces which are transmitted to the spindle bearings, and other problems concern the problem of preventing the rotation of the spindle in an out-of-round manner, and the adjustment of the bearing play.

It is known from the prior art to provide two or three roller bearings for the spindle in order to withstand the axially acting forces. These roller bearings must be precisely coordinated with reference to one another, a task which requires a great skill and substantial time. Despite this, difficulties still occur because the axial forces which are transmitted to and must be absorbed by any particular one of the bearings of the set cannot be determined with any degree of exactitude.

In the case of tail spindles it is known to absorb axial forces acting upon them in that the rear end of the spindle is configured as a piston which extends into a cylinder chamber, an annular seal being provided, to admit pressure fluid into the cylinder chamber to act upon the piston-portion of the spindle so as to counteract the axial force acting upon the spindle and to release the spindle bearing which is subject to this axial force. In this prior-art construction the rear spindle bearing has a cylindrical projection formed at the end of the piston portion and located within the pressure chamber. Since a relatively large amount of hydraulic fluid travels through this chamber, the rear spindle bearing tends to be heated by this fluid, particularly when the spindle rotates at higher speeds, and the oil in the bearing itself becomes heated. This is evidently disadvantageous, as is the further fact that the extent to which bearings can be relieved in this manner is either constant and therefore cannot be adjusted or particular fluctuations in the axial force acting upon the spindle, or else it must be re-adjusted porportional to the axial force acting upon the spindle, each and every time the force varies, by means of a pressure regulating valve.

This prior-art arrangement is therefore also not satisfactory, and neither are other approaches which have been suggested in the prior art but have not led to a satisfactory elimination of the problems resulting from the action of axially directed forces upon a respective spindle.

SUMMARY OF THE INVENTION

Accordingly, it is an object of this invention to overcome the disadvantages of the prior art.

More particularly, it is an object of the present invention to provide a mounting arrangement for a spindle which is subject to axially directed forces, which mounting arrangement avoids the aforementioned disadvantages.

Still more specifically, it is an object of this invention to provide such a mounting arrangement wherein at least one of the spindle bearings can be relieved of the action of the axial force that is exerted upon the spindle.

Another object of the invention is to provide such a mounting arrangement wherein the individual loading of the spindle bearings can be determined with reference to a maximum axial force acting upon the spindle, and wherein it is always assured, when axial forces are acting upon the spindle, that the front bearing for a spindle is free of play in radial direction, independently of temperature conditions.

In keeping with these objects, and with others which will become apparent hereafter, one feature of the invention resides in a mounting arrangement for a spindle which is subject to axially directed forces. Briefly stated, this mounting arrangement comprises support means, at least two longitudinally spaced and axially adjustable anti-friction bearings on the support means and each having an inner and an outer race, and a spindle rotatably journalled in the bearings and having one end adjacent one of the bearings. The spindle is subject to the action of axial forces acting upon the one end in direction toward an other end of the spindle which is adjacent to the other of the bearings. Pressure-exerting means is provided adjacent the other end and operative for exerting upon the other bearing a counter force acting in the direction towards the one end and tending to shift the spindle counter to the axial forces. Transmitting means transmits the counter force to the one bearing for axially adjusting the same relative to the spindle in accordance with the shifting of the spindle.

The novel features which are considered as characteristic for the invention are set forth in particularly in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is an axial section through an embodiment of the invention used for mounting a tail spindle;

DESCRIPTION OF THE PREFERRED EMBODIMENTS

Figure 1:
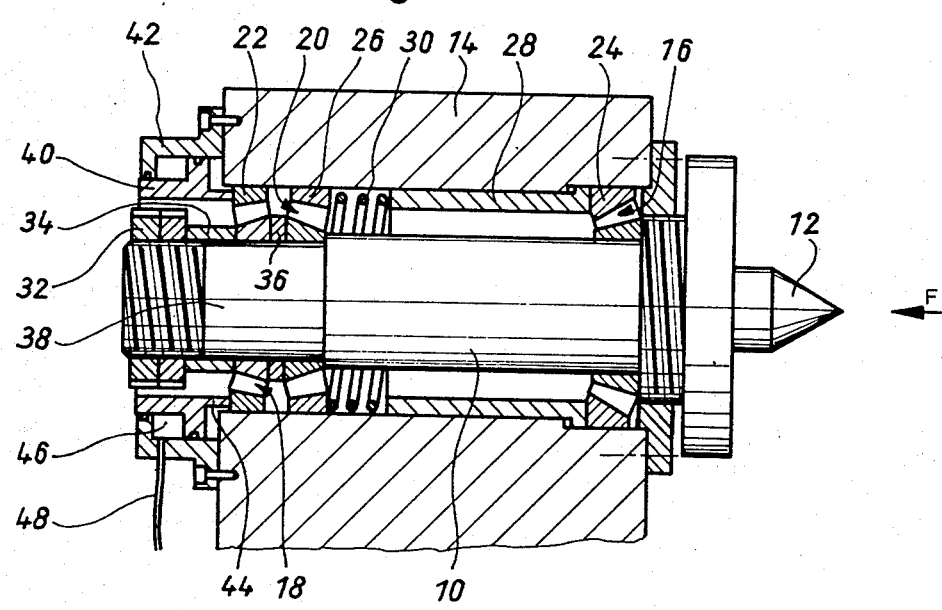
FIG. 1 is an axial section through one embodiment of the invention.

FIG. 1 illustrates a mounting arrangement mounting a working spindle 10 having a centering tip 12, in a head stock 14. The spindle 10 is subject in use to axially directed forces acting upon it in the direction of the arrow F. It is mounted for rotation in a front anti-friction bearing 16 and a rear anti-friction bearing 18, the terms "front" and "rear" referring to the centering tip 12 upon which the force F will act. These bearings 16 and 18 are axial bearings; there is further provided a radial bearing 20 which is located between the bearings 16 and 18, and particularly located adjacent the bearing 18. Bearing 20 could also be replaced with a grooved ball bearing. In the illustrated embodiment all of the bearings 16, 18 and 20 are in form of axially adjustable tapered roller bearings, but they could also be replaced with other axially stressable bearings, for example inclined ball bearings or the like.

The bearing 18 has an outer race 22 and the bearing 16 has an outer race 24; each of the bearings of course also has an inner race in the usual manner. The outer races 22 and 24 are axially adjustable within the housing formed by the head stock 14; the outer race 26 of the bearing 20 is also axially adjustable. Located between the bearings 16 and 20 is a transmitting arrangement which in this embodiment is in form of an axially elastically yieldable device, for example (as shown in FIG. 1) of a sleeve 28 which surrounds the spindle 10 with clearance has one end abutting the outer race 24 of the bearing 16, and an outer end abutting the compression spring 30 which also surrounds the spindle 10 and engages the outer race 26 of the bearing 20. The two elements 28 and 30 thus have the constant tendency to axially prestress the bearing 16, thereby assuring a temperature-independent journalling of the spindle 10 in the bearing 16 which is free of radial play.

The inner races of the bearings 18 and 20 are mounted ahead of ring nuts 32 and interposed sleeve 34 and washer 36 (which transmit counter pressure to the inner races, as will be discussed later) on a cylindrical rear portion 38 of the spindle 10. A portion 38 which also carries the ring nuts 32, extends through a piston 40 which is arranged coaxially with reference to the spindle 10 and is shiftable in a cylinder 42 that is appropriately mounted, for instance on the head stock 14 by means of the illustrated flange and screws. An annular collar 44 of the piston 40 which extends axially forwardly of the same engages the outer race 22 of the bearing 18. The cylinder 42 and the piston 40 together define a pressure chamber 46 which communicates with a fluid line 48 by means of which hydraulic pressure fluid may be admitted into and vented from the chamber 46.

When a workpiece (not shown) engaging the centering tip 12 of the spindle 10 exerts upon the latter an axial force F in the direction of the arrow shown in FIG. 1, this force would normally have to be absorbed by the bearing 16. According to the present invention the bearing 16 is relieved, i.e. the force F is distributed between the bearing 16 and the bearing 18, in that the application of pressure medium via the line 48 into the chamber 46 causes the piston 40 to move counter to the force F and to act upon the outer race 22 of the bearing 18, shifting the outer race 22 axially counter to the force F. In becoming shifted in this manner, the outer race 22 takes along the inner race of the bearing 18 via the tapered rollers of the bearing and causes an axial force upon the spindle 10 which shifts the same counter to the force F. The bearing 20 is also taken along at the same time. As this force is transmitted via the inner race of the bearing 16 (which moves with the spindle 10), the bearing 16 is relieved of a portion of the force F and the radial play which would normally occcur as a result of such a relief, is compensated. By appropriate selection of the pressure which acts in the chamber 45 upon the piston 40, and by coordinating this pressure with the force F, it is possible to so regulate the relief of the bearing 16 that the bearings 16 and 18 will have approximately equal lifetimes.

Figure 3:
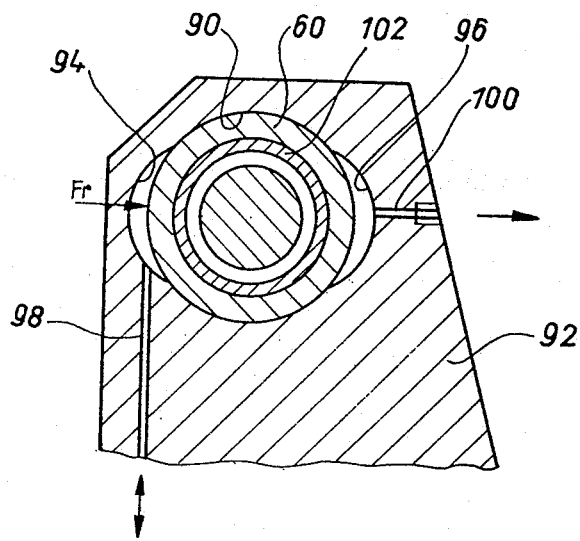
FIG. 3 is a fragmentary section taken on line 3—3 of FIG. 2.
Figure 4:
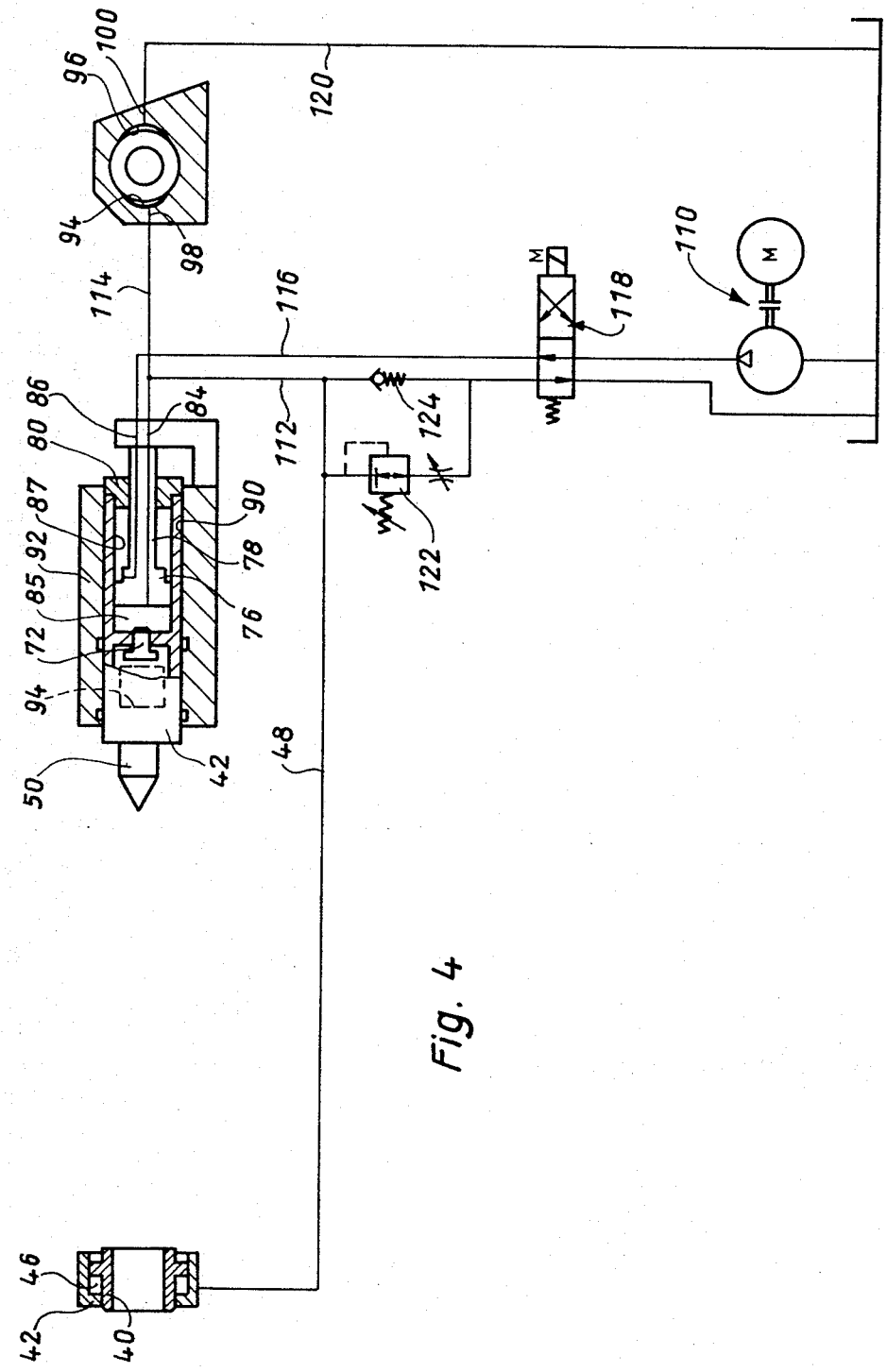
FIG. 4 is a hydraulic circuit diagram for the embodiment in FIG. 2.

The embodiment in FIGS. 2–4 illustrates the journalling of a tail spindle 52 having a workpiece engaging portion 50. The spindle 52 is rotatably journalled in a spindle sleeve 60 by means of a front spindle bearing 52 and a rear spindle bearing 56, as well as a radial bearing 58. In contradistinction to the embodiment of FIG. 1, the embodiment in FIGS. 2–4 has only the outer bearing race 62 of the bearing 56 and the outer bearing race 64 of the bearing 58 mounted for axial adjustment within the sleeve 60. The outer bearing race 66 of the front bearing 54 is mounted so that it cannot move axially. In this embodiment, as in the preceding one, the bearings are axially pre-stressable tapered roller bearings. The outer race 62 of the bearing 56 cooperates with an annular collar 68 of a piston 72 which is guided in a cylinder 70 of the sleeve 60. A further cylinder 74 is formed in the sleeve 60 and located rearwardly of the piston 72, communicating with the passage in which the piston 72 is guided. A fixed piston 76 is mounted in the cylinder 74, e.g. a piston 76 which does not move and whose piston rod 78 extends outwardly through the closure member 80 for the cylinder 74 and is connected to a stationary mount 82. The piston rod 78 is provided with two longitudinally extending channels 84 and 86; the channel 84 communicates with the cylinder chamber 85 of the cylinder 74, and the channel 86 communicates with the cylinder chamber 87 of the cylinder 74. The cross-section of the cylinder 74 is larger than the diameter of the piston 72 (compare FIG. 2) so that the cylinder chamber 85 located at the side of the piston 72 has an annular surface portion 88.

The sleeve 60 is axially shiftable in a guide 90 of a tail stock 92. FIG. 3 shows that the guide 90 is provided in diametrically opposite surface portions of its inner circumferential surface with respective recesses or pockets 94, 96. The pocket 94 communicates with a channel 98 through which pressurized hydraulic fluid may be supplied to it. The pocket 96 communicates with a no-pressure line 100 so that hydraulic fluid which is squeezed out of the pocket 94 and enters into the annular gap between the guide 90 and the sleeve 60 can collect in the pocket 96 and run off through the line 100. Advantageously, the arrangement of the two diametrally opposite pockets 94 and 96 will be such that the radial force resulting from the pressure developed in the pocket 94 and acting upon the sleeve 90, will act in direction of the cutting force.

Analogously to the arrangement of FIG. 1, the embodiment of FIGS. 2–4 provides a pressure-transmitting arrangement in form of a cylinder sleeve 102 which surrounds the spindle intermediate the bearings 54 and 58, and which cooperates with the compression spring 104. The purpose of the arrangement in this embodiment is to maintain the outer bearing race 64 of the bearing 58 in constant contact with the tapered rollers of the bearing 58.

It should be understood that in the embodiment of FIGS. 2–4 the sleeve 60 itself constitutes a part of the transmitting arrangement, as will become apparent from the following description of the operation.

If a workpiece (not shown) exerts an axial force F upon the engaging portion 50 and therefore upon the spindle 52, pressure fluid, particularly hydraulic fluid such as oil, is admitted into the pressure chamber 85, acting upon the piston 72 with a counterforce $F_1$ and moving the piston 72 counter to the force F. Analogously to the arrangement of FIG. 1 the spindle 52 is shifted (to the left in FIG. 2) and the spindle bearing 54 is relieved. To assure in every axial position of the spindle 52 that there is no radial play at the spindle bearing 54, an additional force $F_2$ acts upon the annular surface 88, under the influence of which the sleeve 60 itself shifts counter to the direction of the force F. The sleeve 60 moves the outer bearing ring 66 of the bearing 54 into contact with the tapered rollers of the bearing. When the forces $F_1$ and $F_2$ are appropriately accommodated to one another, this assures a particularly simple and fully automatic load distribution between the bearings and makes possible a selection of the degree of relief afforded the bearing 54 in such a manner that both of the bearings 54 and 56 will have approximately equal lifetimes.

Aside from the pressure relief and elimination of radial play in the bearing 54, it is further possible to achieve with the embodiment of FIGS. 2–4 that a precise setting of the bearings to eliminate play, as is required in all the prior-art spindle bearings, can be omitted, and that elimination of play is assured both when the bearings are cold and when they are hot.

It is advantageous to utilize the present invention in a machine not only to mount the tail spindle, but also to mount the working spindle of the machine (as per FIG. 1). In such a case both of the mounting arrangements can then be supplied with pressure fluid by means of a common hydraulic pump unit 110, as shown in FIG. 4. In this connection it is advantageous if the pressure fluid is supplied to the chamber 46 (of the embodiment of FIG. 1) via a line 112 and the line 48, the line 112 being connected to the channel 84 of the piston 76 or the piston rod 78 thereof. The channel 84, or the line 112 can also be provided with a branch conduit 114 which leads to the channel 98 of the pocket 94, whereas the channel 86 can be connected to a line 116. The lines 112 and 116 may be selectively connected with the hydraulic pump unit 110 by means of a four-way two-position valve 118, in order to alternately supply pressure fluid to the compartment 85 to operate the piston 72, and in the compartment 87 to retract the sleeve 60. If the compartment 85 receives pressure fluid, then the pressure fluid in the compartment 87 is expelled via the channel 86 and the valve 118 into the reservoir of the unit 110. During this movement the sleeve 60 shifts towards the left in FIG. 4 until the workpiece engaging portion 50 engages a workpiece (not shown). Together with the beginning of the movement of the sleeve 60 the line 48 receives pressure fluid which is at relatively low pressure, e.g. 5 bar, during the forward movement of the sleeve 60. When the portion 50 engages the workpiece the working pressure increases, e.g. to 10–60 bar, in the compartment 85 and in the lines 112, 114. This pressure now acts in the pocket 94 (compare FIG. 3) and any pressure fluid which leaks out of the pocket 94 into the pocket 96 is vented via the channel 100 and the line 120. Pressure which develops in the pocket 94 creates a radially acting force Fr (compare FIG. 3) which results from the respective dimensions of the pockets in the fluid pressure selected by the pressure regulating valve 122 shown in FIG. 4. This radial force Fr urges the sleeve 60 against the opposite wall and thus assures a defined play-free orientation. Since the radial force Fr is proportional to the pressure selected with the regulating valve 122, and therefore proportional to the axial force $F_2$ acting upon the sleeve 60, an appropriate selection of the dimensions of the pocket 94 will assure that at any desired selected fluid pressure a playfree radial engagement of the sleeve 60 with the adjacent wall will be obtained, without preventing the sleeve 60 from axial movement. Thus, the sleeve 60 can perform an axial compensating movement even though the force Fr acts upon it. When the sleeve 60 is retracted the valve 112 is moved to its other operating position in which pressure fluid can flow from the compartment 85 via the channel 84 and a one-way valve 124 in no-pressure state, and the channel 86 receives pressure fluid which is admitted into the compartment 87 to retract the sleeve 60.

Figure 5:
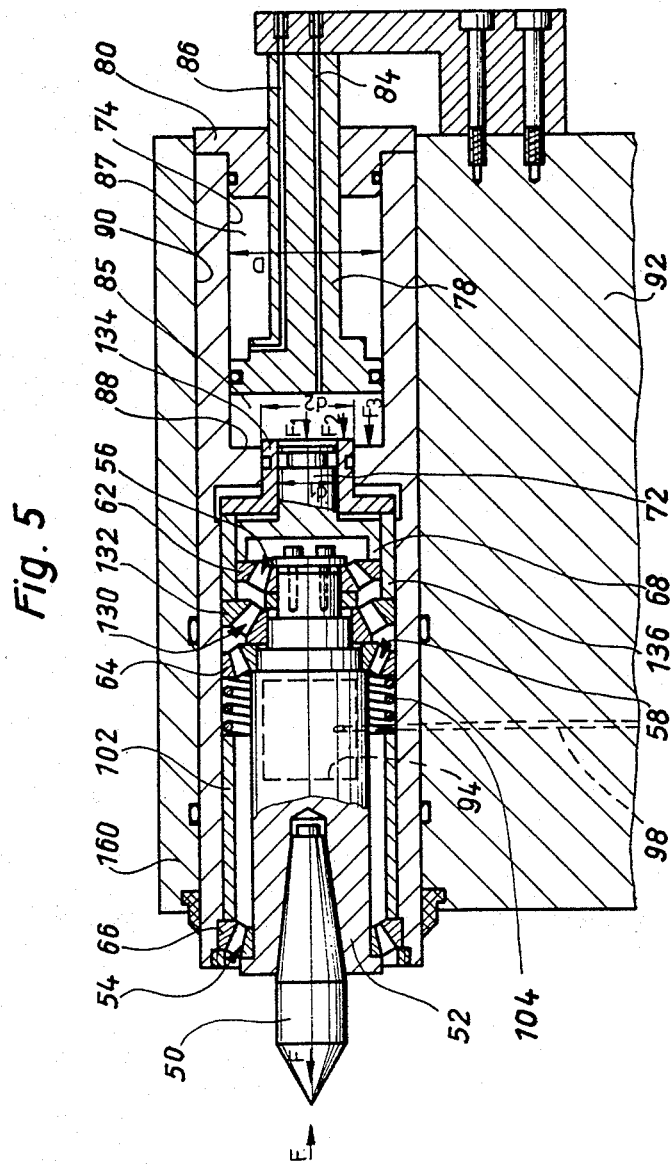
FIG. 5 is a view similar to FIG. 2, illustrating a further embodiment of the invention.

FIG. 5, finally, shows still a further embodiment of the invention, again illustrated with respect to the journalling of a tail spindle. This embodiment differs from that of FIGS. 2 and 3 in that the rear spindle bearing 56 serving to absorb axial forces has located adjacent to it a further spindle bearing 130 for the spindle 52. In this embodiment the respective outer races 62 and 32 of the bearings 56 and 130 are both axially adjustable in order to relief the front spindle bearing 52. Each of the races 62 and 132 has associated with it a piston 72 or 134, respectively. Piston 72 has a collar 68 which acts upon the race 62; the piston 72 is shiftable within the piston 134 which in turn acts an intermediate sleeve 136 upon the outer race 132 of the bearing 130. The outer race 62 of the bearing 56 is axially shiftably mounted within the sleeve 136.

In the embodiment of FIG. 5, as in FIGS. 2 and 3 the diameter of the compartment 85 is substantially greater than the diameter of the annular piston 134, so that the axial force which acts in the compartment 85 is subdivided into the axial force components $F_1$, $F_2$ and $F_3$ is appropriate coordination of the diameter D of the compartment 85 and the diameters $d1$ and $d2$ of the pistons 72 and 134. The force components $F_1$ and $F_2$ act upon the pistons 72 and 134, respectively, and the force component $F_3$ acts upon the sleeve 60.

The hydraulic circuit arrangement shown in FIG. 4 can of course be utilized in combination with the embodiment in FIG. 5 and the embodiment in FIG. 1.

Particularly in the case of arrangements such as that of FIG. 1, or analogous to it, wherein it is a working spindle that is mounted rather than a tail spindle, it is advantageous both in terms of the desired force relief for the axial bearings and to eliminate the possibility of radial play of the front bearing, if not only the outer race of the rear bearing but also the outer race of the front bearing is axially movable in the housing. This assures that the transmitting arrangement will always maintain the outer race of the front bearing in contact with the bearing elements of the same, for example the tapered rollers, in turn assuring that there will never be any radial play irrespective of the operating temperature at which the arrangement is at any given time, i.e. whether its components are cold or warm or hot.

The embodiment of FIG. 5, utilizing two bearings at the rear end of the spindle, is particularly advantageous in applications where the spindle, especially the tail spindle, is subject to rather high axial forces F. The utilization of the pockets 94 and 96, described above in connection with their operation, overcomes a particular problem of the prior art which is encountered in tail spindles and spindle sleeves therefor. Radial play existing between the spindle sleeve and the guide of the tail stock in which the spindle sleeve is received in such construction, always posed a substantial problem and in the prior art either required clamping sleeves which were operated mechanically or hydraulically, or a slotted tail stock housing which could be drawn together transversely of the slot by means of clamping screws. This of course was complicated and required additional space, aside from the fact that whenever any of these arrangements were operated to eliminate the radial play they also tended to prevent the spindle sleeve from moving axially. Moreover, many of the clamping sleeves used were elastically yieldable in radial direction and therefore did not readily perform their intended function anyhow. The use of the pockets 94 and 96, and the components which supply pressure fluid to the pocket 94, eliminates all of these problems in the manner described above. Of course, the pocket 94 could be utilized by itself, but I currently prefer to utilize it in conjunction with the pocket 96.

It will be understood that each of the elements described above, or two or more together, may also find a useful application in other types of constructions differing from the types described above.

While the invention has been illustrated and described as embodied in a mounting arrangement for a spindle which is subject to axially directed forces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mounting arrangement for a spindle which is subject to axially directed forces, comprising support means; at least two longitudinally spaced and axially adjustable anti-friction bearings on said support means and each having an inner and outer race; a spindle rotatably journalled in said bearings and having one end adjacent one of said bearings, said spindle being subject to the action of axial forces acting upon said one end in direction toward an other end of the spindle which is adjacent the other of said bearings; pressure-exerting means adjacent said other end and operative for exerting upon said other bearing a counter force acting in direction towards said one end and tending to shift said spindle counter to said axial forces; and transmitting means for transmitting said counter force to said one bearing for axially adjusting the same relative to said spindle in accordance with the shifting of said spindle.

2. A mounting arrangement as defined in claim 1, wherein said pressure-exerting means engages and axially adjusts said outer race of said other bearing.

3. A mounting arrangement as defined in claim 1, wherein said transmitting means engages and axially adjusts said outer race of said one bearing.

4. A mounting arrangement as defined in claim 1, wherein said pressure-exerting means comprises wall means forming a cylinder chamber adjacent said other bearing at an axial end of the latter which faces away from said one bearing, a piston movable in said chamber into engagement with the outer race of said other bearing, and means for admitting pressure fluid into said chamber to urge said piston against said outer race of said outer bearing.

5. A mounting arrangement as defined in claim 1; and further comprising an axially adjustable radial bearing also journalling said spindle for rotation.

6. A mounting arrangement as defined in claim 5, wherein said radial bearing is arranged axially adjacent said other bearing intermediate the same and said one bearing; said transmitting means comprising an axially elastically yieldable force-transmitting element surrounding said spindle with radial spacing and bearing upon said outer race of said one bearing and upon an outer race of said radial bearing.

7. A mounting arrangement as defined in claim 6, wherein said element comprises a sleeve having an endface abutting one of said outer races of said one bearing and said radial bearing, and a compression spring abutting an opposite endface of said sleeve and acting upon the other of said outer races of said one bearing and said radial bearing.

8. A mounting arrangement as defined in claim 1, wherein said outer race of said one bearing is mounted in said support means for adjustable displacement axially of said spindle.

9. A mounting arrangement as defined in claim 4, wherein said support means comprises a tailstock, and a spindle sleeve surrounding said spindle and bearings and being axially movable relative to said tailstock; said spindle sleeve having a further cylinder chamber axially adjacent said piston and open to a free axial endface of the latter, and a further piston in said further chamber and fixedly connected with said spindle sleeve and formed with fluid channels, the first-mentioned piston having a fluid-impinged surface in said chamber whose area is smaller than the cross-sectional surface area of said further chamber.

10. A mounting arrangement as defined in claim 9; and further comprising a radial bearing journalling said spindle adjacent said other bearing; said transmitting means comprising a transmitting element which respectively engages an outer race of said radial bearing and the axially fixed outer race of said one bearing.

11. A mounting arrangement as defined in claim 9; further comprising an additional axially adjustable bearing journalling said other end of said spindle at an axial side of said other bearing which faces away from said one bearing, and additional pressure-exerting means for said additional bearing and including an additional piston, said additional piston and an outer race of said additional bearing being axially adjustable within the first-mentioned piston.

12. A mounting arrangement as defined in claim 9, said tailstock having a passage accommodating said spindle sleeve and having an inner surface formed with at least one compartment open to an outer circumferential surface of said spindle sleeve and connectable to a source of pressure fluid.

13. A mounting arrangement as defined in claim 12; further comprising at least one additional compartment formed in said inner surface of said passage opposite the first-mentioned compartment, and an outflow port communicating with said additional compartment, so that pressure fluid escaping from its first-mentioned compartment can collect in said additional compartment and be vented therefrom in a said outflow part.

14. A mounting arrangement as defined in claim 12, wherein said compartment is arranged for said pressure fluid therein to exert a radial force acting upon said spindle sleeve in direction transversely of the elongation of the same.

15. A mounting arrangement as defined in claim 13, wherein said compartments have approximately equal dimensions.

* * * * *